Figure 4:
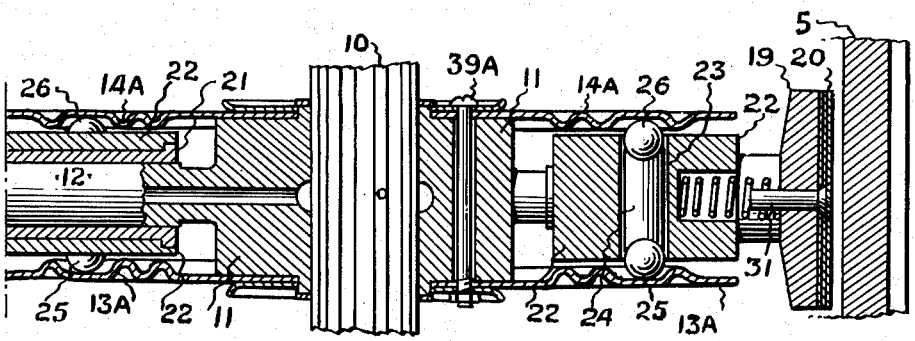

Dec. 12, 1950  H. G. KIRKPATRICK  2,534,133
CENTRIFUGAL CLUTCH
Filed Aug. 20, 1946  3 Sheets-Sheet 1
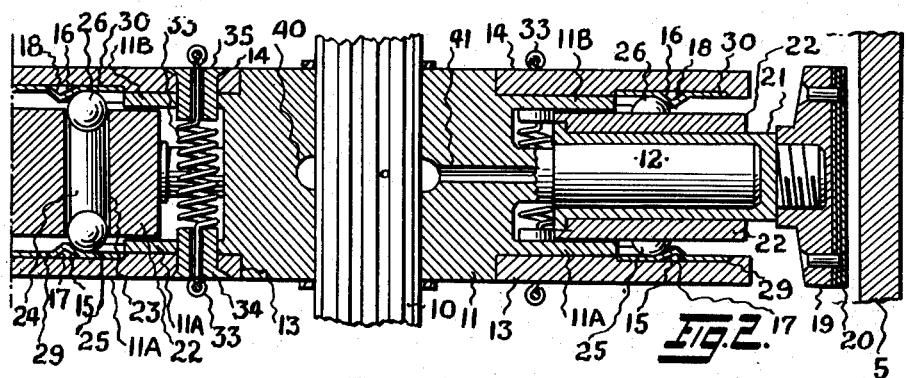
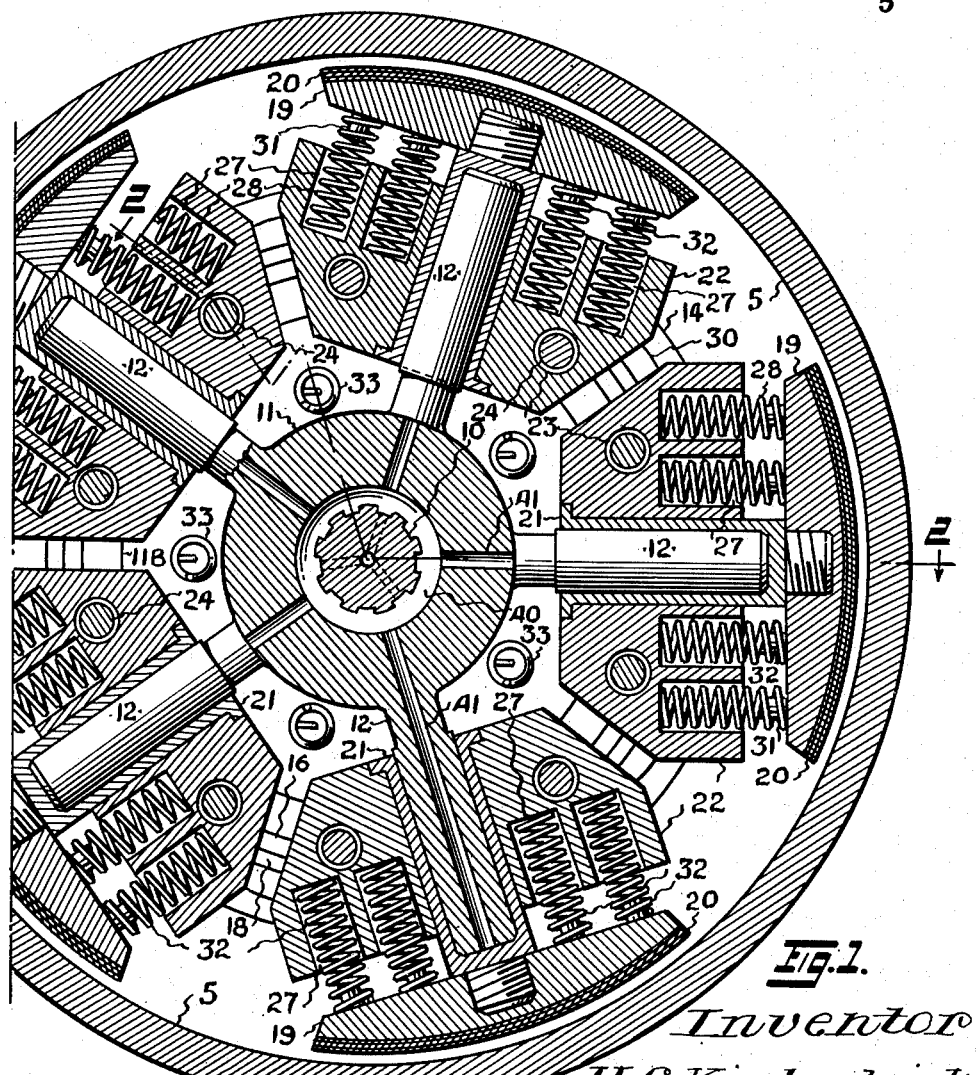
Inventor
H. G. Kirkpatrick Dec. 12, 1950 H. G. KIRKPATRICK 2,534,133
CENTRIFUGAL CLUTCH Filed Aug. 20, 1946 3 Sheets-Sheet 2

Inventor
H. G. Kirkpatrick
By Glascock Downing Seebold
Attys.

Dec. 12, 1950  H. G. KIRKPATRICK  2,534,133
CENTRIFUGAL CLUTCH
Filed Aug. 20, 1946  3 Sheets-Sheet 3
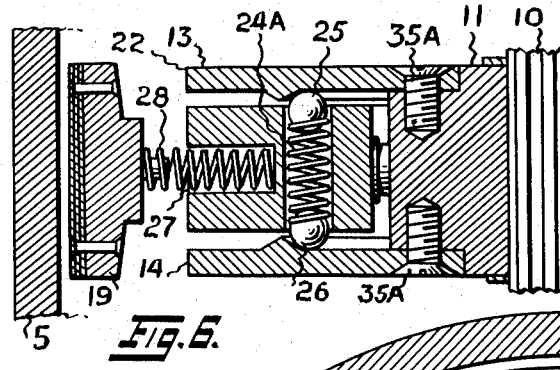
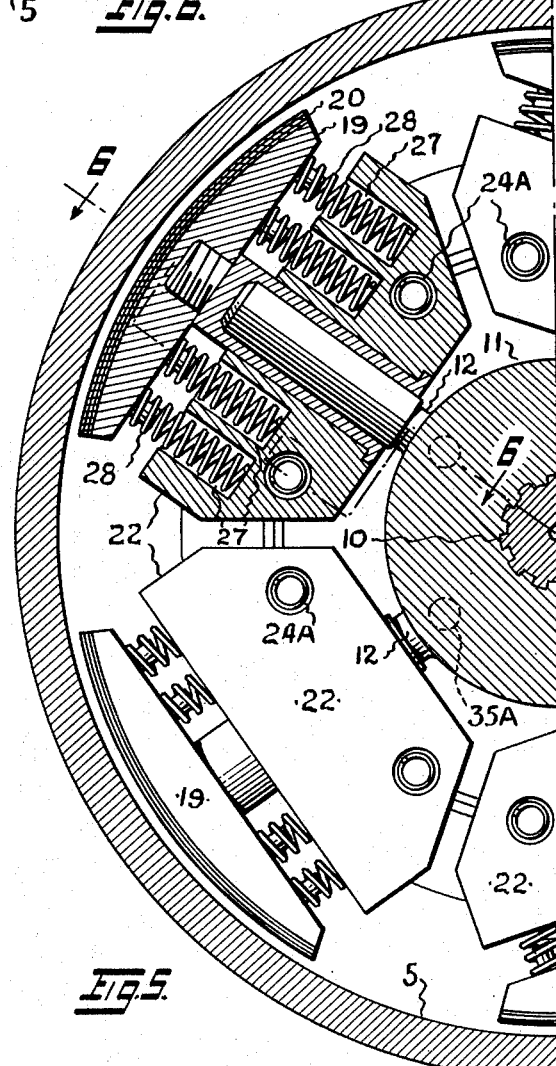
Inventor
H. G. Kirkpatrick Patented Dec. 12, 1950

2,534,133

UNITED STATES PATENT OFFICE 2,534,133

CENTRIFUGAL CLUTCH

Herwald Gordon Kirkpatrick, Edgecliff, near Sydney, New South Wales, Australia

Application August 20, 1946, Serial No. 691,730
In Australia August 25, 1945

8 Claims. (Cl. 192—105)

This invention relates to automatic clutches of the type wherein centrifugal force is employed to move a shoe or shoes outwardly and press them into engagement with the inner surface of a drum or other member to be clutched.

In known clutches of this type driving engagement takes place when the rotation of the driving member has reached a predetermined speed, that is, when the centrifugal force has reached a magnitude which is capable of engaging the member to be clutched to transmit the full torque of the driver and disengagement takes place when the speed of the driving member is substantially the same but slightly below said predetermined speed. This has the disadvantage that in the case of such a clutch being employed in a motor vehicle considerable and unnecessary slip occurs while disengagement is such that the vehicle cannot be driven at low speeds in all gear ratios, particularly top gear, because when the engine speed falls slightly below the predetermined speed or speed of driving engagement the centrifugal force is reduced so that the shoe or shoes either slip or become disengaged from the drum or driven member.

This invention finds particular but not exclusive application to gear boxes for automatic operation whether the clutch is driven by the engine or on an intermediate shaft or the tail shaft driven by a gear train of the gear box.

The primary object of the present invention is to provide an improved clutch of the above type in which the shoe or shoes will be prevented from engagement with the member to be clutched until a predetermined speed has been reached when they are released and a smooth uniform engagement of the shoes takes place with a governed amount of slip after which the full torque of the driver is transmitted. Disengagement takes place at a lower predetermined speed as the shoe or shoes are maintained in driving engagement with the member to be clutched and capable of transmitting the full torque of the driver until the speed of the driving member has fallen to a degree considerably lower than the speed of engagement of the shoe or shoes with the member to be clutched when they disengage uniformly and instantaneously.

The invention comprises a clutch of the type wherein a shoe or shoes are mounted on a driving member for outward movement under centrifugal action into engagement with a member to be clutched and having means whereby on acceleration the shoe or shoes are retained in position until a predetermined speed is reached when the shoe or shoes are released to smoothly engage the member to be clutched and after a governed amount of slip transmit the full torque of the driver; while during deceleration the shoe or shoes will be maintained in driving engagement and continue to transmit the full torque of the driver until any low predetermined speed is reached when they uniformly and instantaneously disengage.

More specifically considered, a clutch according to the invention comprises a plurality of shoes mounted for outward movement under centrifugal action of a driving member and a weight associated with each shoe and capable of limited outward movement under centrifugal action independently of the outward movement of the shoe; resilient means such for example a compression spring or springs between each shoe and its associated weight and means for releasing the shoes with their associated weights, and means for releasably holding the weights in a position with the springs under compression whereby when the speed is decreasing the shoes continue to be maintained in engagement and transmitting the full torque of the driver by centrifugal force and spring pressure until a predetermined lower speed is reached when the shoes disengage uniformly and instantaneously.

Figure 3:
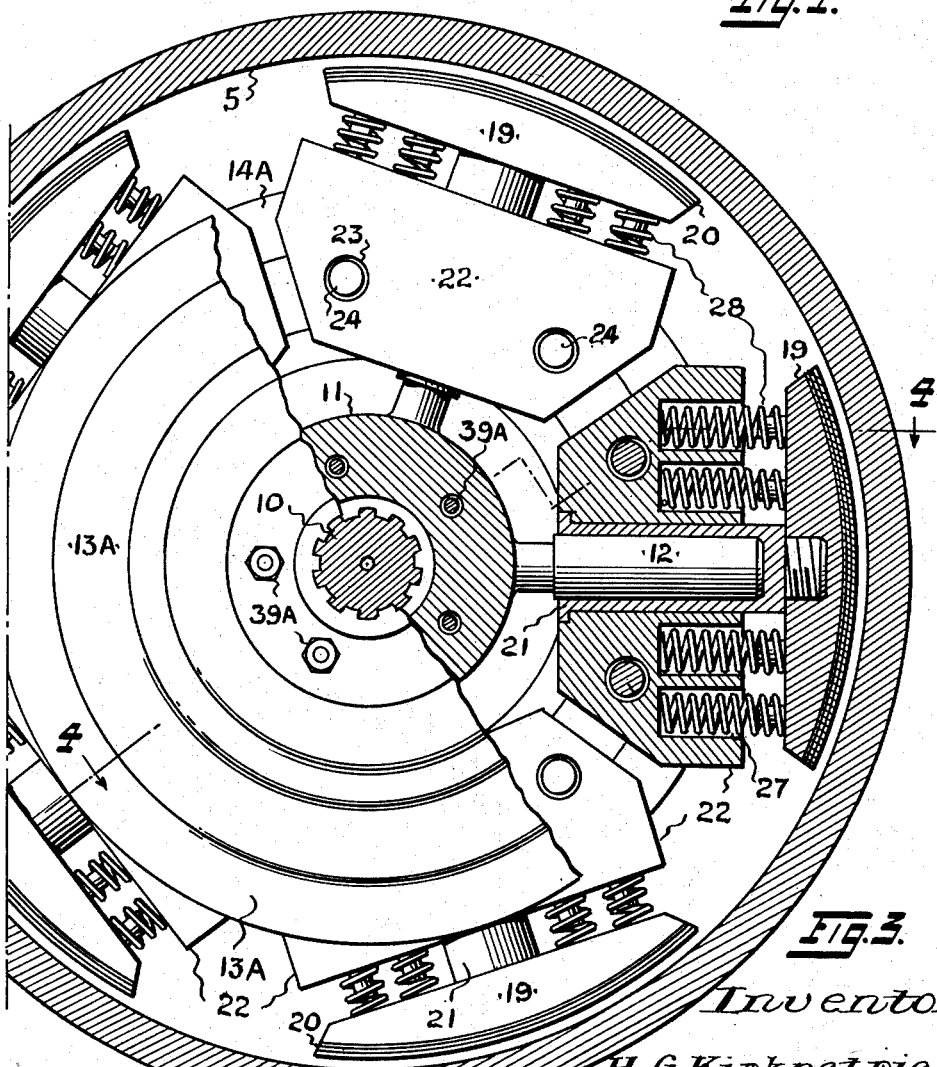

In the accompanying drawings which illustrate clutches according to the invention:

Figure 1 is a sectional elevation of a portion of a clutch according to the invention, Figure 2 is a sectional elevation on the line 2—2 of Figure 1, Figure 3 is a view similar to Figure 1 showing a modified form of clutch, Figure 4 is a sectional elevation on the line 4—4 of Figure 3, Figure 5 is a view similar to Figure 1 showing a further modified form of clutch, and Figure 6 is a sectional elevation on the line 6—6 of Figure 5.

Referring to Figures 1 and 2 a driving shaft 10, for example, an engine shaft of a motor road vehicle or a tail or intermediate shaft driven by a gear train of an automatic gear box has keyed or splined thereto a hub 11 being the driving member of the clutch and having integral therewith radial driving pins 12.

Slidably mounted on each pin is a sleeve 21 and the inner end of each sleeve has an outwardly extending flange. The other end of each sleeve 21 has secured thereto a shoe 19 having secured on its outer surface as by means of rivets a layer of brake lining material 20 such as that employed for friction lining clutches or shoes of the brakes of motor road vehicles. The other surface of each shoe is curved and this also applies to the outer surface of the lining, the curvature of the latter being struck from a radius equal to the inner cylindrical surface of a drum 5 which constitutes a member to be clutched.

Slidable on each sleeve 21 is a weight 22, having a central bore slidably to receive the sleeve 21 and may have inwardly convergent end faces. Each weight has transverse bores 23 therethrough in each of which is slidably mounted a spacer 24 each end of which may be formed as a concave spherical surface. Each spacer is shorter than the length of its bore so that the latter at each end can partially accommodate one of a pair of anti-friction abutment balls 25, 26. As will be seen in Figure 2 nearly one half of each ball projects beyond the plane of the adjacent side of the weight.

Each weight also has cylindrical holes 27, spaced on either side of the axis of its sleeve 21 and each hole 27 receives a compression spring 28 which bears at one end on the bottom of the hole and at the other end on the inner plane surface of the brake shoe. Pins 31 and 32 projecting downwardly from the shoes into the upper ends of the springs may be provided to prevent lateral displacement of the shoes 19.

The hub 11 has a pair of outwardly extending radial flanges 11a, 11b, having their inner surfaces spaced from the sides of the weights 22 so as not to interfere with inner and outward movements of the latter. Mounted on each side of the hub 11 are side plates 13, 14, having secured against their inner surfaces annular plates 29, 30, which have an annular projection V-shape in cross section providing inner ramp surfaces 15 and 16 and outer ramp surfaces 17 and 18 for the anti-friction balls.

Each side plate has a plurality of pairs of guide pins 34 and 35, each of which projects through the adjacent hub flanges 11a and 11b, so that the side plates 13 and 14 rotate with the hub 11. Each pair of guide pins 34, 35, has anchored thereto the respective ends of a tension spring 33 and it will be seen from Figures 1 and 2 that these springs 33 extend across the face of the hub 11 and between the pins 12.

In operation the shaft 10 is rotated by starting the engine or other prime mover, when the hub 11 commences to drive the clutch and as the speed increases centrifugal action is first resisted by the tension springs 33 but on further increase of speed the increase of centrifugal force acting on the shoes 19 and weights 22 causes them to commence to move outwardly together relatively to the pins 12. At the same time the abutment balls 25, 26, ride up the inner ramp surfaces 15 and 16 forcing the side plates 13, 14 and guide pins 34 and 35 outwardly and before the balls have reached the crests of the ramps the shoes are uniformly in engagement with the inner surface of the drum 5. As the speed further increases the weights continue to move uniformly outwardly relatively to the shoes compressing the springs 28 which act on the shoes to press the latter more firmly into engagement with the inner surface of the drum 5 and when the balls overrun the crests of the ramp the side plates are returned by the springs 33 to their inward positions, when springs 28 are compressed to their fullest extent and the weights in positive contact with the shoes which are then engaged without slip with the drum 5 and capable of transmitting the full torque of the driver.

When the speed of the shaft 10 and hub 11 decreases to a low predetermined limit the decrease of centrifugal force permits the springs 28 to react on the weights and at the same time continue to exert outward pressure on the shoes. As the resistance of the springs 33 is overcome the side plates 13 and 14 again move outwardly, the balls riding on the outer surfaces 17 and 18 of the ramps. After the balls have passed over the crests of the ramps the springs 33 act to force the plates 13 and 14 inwardly, assisting the springs 28 in forcing the weights further inwardly until they act upon the flanges of the sleeves 21 so as to instantaneously and uniformly disengage the shoes with the drum 5 or clutched member.

In a modified form of construction shown in Figures 3 and 4 a pair of diaphragms 13a and 14a secured to driving hub 11 by bolts 39a is substituted for the side plates 13 and 14, guide pins 34 and 35 and tension springs 33 of Figures 1 and 2.

In a further modified form of construction shown in Figures 5 and 6 a compression spring 24a between each pair of abutment balls 25, 26, substitute the spacers 24 and springs 33 of Figures 1 and 2 and the side plates 13 and 14 are fixed to the driving hub 11 by screws 35a.

Lubrication is effected by means of a central passage in driving shaft 10 in communication with an annular groove 40 from which passages 41 extend through the pins 12 and carry lubricant to sleeves 21 and other movable parts.

I claim:

1. In a clutch a rotatable member, a member to be clutched to said rotatable member, a clutch member for engaging said member to be clutched and adapted to be rotated by said rotatable member, a weight mounted in relation to the rotatable member so as to be driven outwardly by centrifugal force when the rotatable member is rotated, resilient means interposed between the weight and the clutch member and acting when compressed therebetween to provide at one side the force for engaging the clutch member with the member to be clutched and at the other side a force for opposing the centrifugal force exerted by the weight and means whereby when the resilient means has been compressed to a predetermined extent an additional force, independent of the centrifugal force and acting in the direction opposing release of the compression of the resilient means, is brought to bear on the resilient means, said means comprising an abutment on the weight engaging a spring diaphragm having inner and outer annular ramp surfaces on the side adjacent the weight and convergent towards the weight.

2. In a clutch a rotatable member, a member to be clutched to said rotatable member, a clutch member for engaging said member to be clutched and adapted to be rotated by said rotatable member, a weight mounted in relation to the rotatable member so as to be driven outwardly by centrifugal force when the rotatable member is rotated, resilient means interposed between the weight and the clutch member and acting when compressed therebetween to provide at one side the force for engaging the clutch member with the member to be clutched and at the other side a force for opposing the centrifugal force exerted by the weight and means whereby when the resilient means has been compressed to a predetermined extent an additional force, independent of the centrifugal force and acting in the direction opposing release of the compression of the resilient means is brought to bear on the resilient means, said means comprising an abutment on the weight engaging a side plate axially movable on the clutch against spring pressure and having inner and outer annular ramp surfaces on the side adjacent the weight and convergent towards the weight.

3. A friction clutch comprising a plurality of shoes mounted on a rotary driving member for outward movement under centrifugal force into frictional engagement with a member to be driven, weights associated with the shoes, springs between the weights and shoes, the weights being capable of outward movement relatively to the shoes under centrifugal force to press the shoes through the medium of the springs, against the member to to be driven on acceleration of the driving member to a speed above the speed at which the shoes engage the member to be driven, and means carried by the driving member and which co-operates with means carried by the weights releasably to hold the weights from inward movement relatively to the shoes until on deceleration of the driving member it rotates at a lower speed than that at which the shoes move outwardly under centrifugal force into engagement with the driven member, said means carried by the driving member comprising a pair of spring diaphragms each secured by its central portion to the driving member and having annular converging ramp surfaces and abutments carried by the weights and engaging the diaphragms.

4. In a friction clutch a rotatable member, a member to be clutched to said rotatable member, a clutch member for engaging said member to be clutched and adapted to be rotated by said rotatable member, a weight mounted in relation to the rotatable member so as to be driven outwardly by centrifugal force when the rotatable member is rotated, resilient means interposed between the weight and the clutch member and acting when compressed therebetween to provide at one side the force for engaging the clutch member with the member to be clutched and at the other side a force for opposing the centrifugal force exerted by the weight, and means for providing an additional inward force on the weight over a certain range of its movement so that the resilient means is not compressed until a predetermined speed of revolution of the rotatable member is reached whereupon the clutch member is smoothly engaged with the member to be clutched by a gradually increasing compression of the resilient means over a predetermined range of speeds of revolution and at a predetermined lower speed of revolution the clutch member is rapidly disengaged from the member to be clutched by a rapid inward movement of the weight releasing the compression of the resilient means.

5. In a friction clutch a rotatable member, a member to be clutched to said rotatable member, a clutch member for engaging said member to be clutched and adapted to be rotated by said rotatable member, a weight mounted in relation to the rotatable member so as to be driven outwardly by centrifugal force when the rotatable member is rotated, resilient means interposed between the weight and the clutch member and acting when compressed therebetween to provide at one side the force for engaging the clutch member with the member to be clutched and at the other side a force for opposing the centrifugal force exerted by the weight, and means for providing an additional inward force on the weight over a certain range of its movement so that the clutch member is held disengaged from the member to be clutched until a predetermined speed of revolution of the rotatable member is reached whereupon the clutch member is smoothly engaged with the member to be clutched by a gradually increasing compression of the resilient means over a predetermined range of speeds of revolution and at a predetermined lower speed of revolution the clutch member is rapidly disengaged from the member to be clutched by a rapid inward movement of the weight releasing the compression of the resilient means the rapid inward movement continuing while the weight positively engages the clutch member to withdraw it from contact with the member to which it was clutched.

6. In a friction clutch a rotatable member, a member to be clutched to said rotatable member, a clutch member for engaging said member to be clutched and adapted to be rotated by said rotatable member, a weight mounted in relation to the rotatable member so as to be driven outwardly by centrifugal force when the rotatable member is rotated, resilient means interposed between the weight and the clutch member and acting when compressed therebetween to provide at one side the force for engaging the clutch member with the member to be clutched and at the other side a force for opposing the centrifugal force exerted by the weight, and spring-loaded ramp and abutment means for providing an additional inward force on the weight over a certain range of its movement so that the resilient means is not compressed until a predetermined speed of revolution of the rotatable member is reached whereupon the clutch member is smoothly engaged with the member to be clutched by a gradually increasing compression of the resilient means over a predetermined range of speeds of revolution and at a predetermined lower speed of revolution the clutch member is rapidly disengaged from the member to be clutched by a rapid inward movement of the weight releasing the compression of the resilient means.

7. In a friction clutch a rotatable member, a member to be clutched to said rotatable member, a clutch member for engaging said member to be clutched and adapted to be rotated by said rotatable member, a weight mounted in relation to the rotatable member so as to be driven outwardly by centrifugal force when the rotatable member is rotated, resilient means interposed between the weight and the clutch member and acting when compressed therebetween to provide at one side the force for engaging the clutch member with the member to be clutched and at the other side a force for opposing the centrifugal force exerted by the weight, means for providing an additional inward force on the weight over a certain range of its movement so that the resilient means is not compressed until a predetermined speed of revolution of the rotatable member is reached whereupon the clutch member is smoothly engaged with the member to be clutched by a gradually increasing compression of the resilient means over a predetermined range of speeds of revolution and at a predetermined lower speed of revolution the clutch member is rapidly disengaged from the member to be clutched by a rapid inward movement of the weight releasing the compression of the resilient means and means whereby when the resilient means has been compressed to a predetermined extent an additional outward force is provided acting on the weight over a certain range of its movement.

8. A clutch as claimed in claim 6 in which the clutch member is slidably mounted by means of sleeves on pins projecting from the rotatable member and the weight is slidably mounted on the sleeves the inner end of each sleeve having an outwardly extending flange which limits the inward movement of the weight in relation to the sleeves.

HERWALD GORDON KIRKPATRICK.

REFERENCES CITED

The following references are of record in the file of this patent:

UNITED STATES PATENTS

| Number | Name | Date |
|---|---|---|
| 1,197,895 | Bendl | Sept. 12, 1916 |
| 1,948,084 | Welch | Feb. 20, 1934 |
| 2,034,988 | Nilsson et al. | Mar. 24, 1936 |
| 2,068,185 | Kreis | Jan. 19, 1937 |
| 2,166,357 | Keller | July 18, 1939 |
| 2,170,926 | Keller | Aug. 29, 1939 |
| 2,174,191 | Keller | Sept. 26, 1939 |

FOREIGN PATENTS

| Number | Country | Date |
|---|---|---|
| 173,962 | Switzerland | Mar. 1, 1935 |
| 269,523 | Germany | Jan. 23, 1912 |